(12) United States Patent  (10) Patent No.: US 9,083,837 B2
Tredoux et al.  (45) Date of Patent: Jul. 14, 2015

(54) SYSTEM AND METHOD FOR KEYED OPERATION OF DEVICES USING NEAR FIELD COMMUNICATION

(71) Applicant: XEROX CORPORATION, Norwalk, CT (US)

(72) Inventors: Gavan L. Tredoux, Penfield, NY (US); Roger T. Kramer, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 13/850,847

(22) Filed: Mar. 26, 2013

(65) Prior Publication Data

US 2014/0293306 A1    Oct. 2, 2014

(51) Int. Cl.
*G06F 3/12* (2006.01)
*H04N 1/00* (2006.01)
*H04B 5/00* (2006.01)
*G06K 15/00* (2006.01)

(52) U.S. Cl.
CPC ......... *H04N 1/00973* (2013.01); *H04B 5/0025* (2013.01)

(58) Field of Classification Search
CPC . G06F 7/0008; G06F 7/10237; G06F 3/1204; G06F 3/1236; G06F 3/1285
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| 8,150,915 | B1 | 4/2012 | Raman et al. | |
|---|---|---|---|---|
| 2008/0168542 | A1* | 7/2008 | Sato | 726/5 |
| 2009/0034731 | A1* | 2/2009 | Oshima | 380/270 |
| 2009/0036056 | A1* | 2/2009 | Oshima et al. | 455/41.3 |
| 2009/0052348 | A1* | 2/2009 | Kato et al. | 370/254 |
| 2009/0066998 | A1* | 3/2009 | Kato | 358/1.15 |
| 2009/0103124 | A1* | 4/2009 | Kimura et al. | 358/1.15 |
| 2009/0210931 | A1* | 8/2009 | Hashimoto | 726/4 |
| 2010/0069008 | A1* | 3/2010 | Oshima et al. | 455/41.3 |
| 2011/0292445 | A1* | 12/2011 | Kato | 358/1.15 |
| 2012/0264372 | A1* | 10/2012 | Chen et al. | 455/41.1 |
| 2012/0274992 | A1* | 11/2012 | Suzuki | 358/474 |
| 2013/0148163 | A1* | 6/2013 | Hashimoto | 358/1.15 |
| 2013/0215467 | A1* | 8/2013 | Fein et al. | 358/1.15 |
| 2013/0257771 | A1* | 10/2013 | Tomono | 345/173 |
| 2013/0258381 | A1* | 10/2013 | Sato | 358/1.13 |
| 2013/0258382 | A1* | 10/2013 | Sato | 358/1.13 |
| 2013/0286433 | A1* | 10/2013 | Matsushima et al. | 358/1.15 |
| 2014/0022591 | A1* | 1/2014 | Asahara | 358/1.15 |

* cited by examiner

*Primary Examiner* — Thierry L Pham
(74) *Attorney, Agent, or Firm* — MH2 Technology Law Group LLP

(57) ABSTRACT

In implementations, a computer-implemented method for operating a multifunctional device (MFD) is disclosed. The computer-implemented method can include receiving a identification information from a tag that is associated with a MFD; identifying, by a processor, one or more operations based on the identification information that was received; and transmitting the one or more operations to the MFD.

17 Claims, 4 Drawing Sheets

SYSTEM AND METHOD FOR KEYED OPERATION OF DEVICES USING NEAR FIELD COMMUNICATION

FIELD

The present disclosure relates to control and operation of multifunctional devices. More particularly, the present disclosure relates to methods, systems, devices, and computer-readable medium for customizable control and operation of multifunctional devices using NFC or similar tags.

BACKGROUND

Multifunction devices (MFDs) such as copiers, printers, scanners, etc. comprise a user interface (UI) that contains many options for performing tasks like copying, scanning and faxing. Often, the user interface of the MFDs is difficult and time-consuming to repeatedly alter to set the various options supported by the MFDs and back-end workflow systems which process input from, and output to, MFDs. Many users tend to repeat the same operations over time and can benefit from a simpler way to store and use the relevant settings. It is especially useful for users to have their own easily repeated settings, as opposed to having repeatable settings which all users must share, since per-user settings provide flexibility and versatility, allowing a wider range of different uses to be extracted from the same device with less effort.

Conventional approaches require that users first login to a device, such as an MFD, and then use UI buttons, which are programmed with actions and options. In practice, requiring users to login is clumsy and a significant hurdle to adoption. Attempting to improve the user experience through more sophisticated hardware (keyboards, touch screens etc.) requires a significant increase in device unit manufacturing cost.

There is therefore a need for a computer-implemented method, a system, a device, and a computer-readable medium that provides a faster and more convenient operation of repeated actions on devices, like MFDs, user-operable computing devices, and associated cloud systems.

SUMMARY

In implementations, a computer-implemented method for operating a multifunctional device (MFD) is disclosed. The computer-implemented method can include receiving a identification information from a tag that is associated with a MFD; identifying, by a processor, one or more operations based on the identification information that was received; and transmitting the one or more operations to the MFD.

In implementations, the identification information is received from the tag over a near-field communication protocol.

In implementations, the one or more operations transmitted to the MFD can be transmitted over a communications protocol comprising: TWAIN, WS-Scan, EIP, or Web Services for Devices.

In implementations, the one or more operations comprises operations provided to the MFD can include any, or combinations of, scanning, printing, faxing, formatting, selecting paper size, selecting paper quality, storage, and combinations thereof.

In implementations, the MFD can comprise devices that comprise capabilities including any, or combinations of, scanning, printing, faxing, and combinations thereof.

In implementations, the method can further comprise initializing the identification information of the tag with the one or more operations to be performed by the MFD associated with the tag.

In implementations, the tag can be operable to communicate using near field communication, radio frequencies, or a Bluetooth protocol.

In implementations, the tag can be a active tag with an associated power source or a passive tag. The tag can be a computational tag or a passive tag.

In implementations, the one or more operations can comprise instructions to the MFD, instructions to a computing device that received the identification information, instructions to a third party network service, instructions that are human-readable and human-actionable, or combinations thereof. The third party network service can comprises a back-end workflow service.

In implementations, a device is disclosed that can comprise one or more processors; and a non-transitory computer readable medium comprising instructions that cause the one or more processors to perform a method comprising: receiving a identification information from a tag that is associated with a MFD; identifying one or more operations based on the identification information that was received; and transmitting the one or more operations to the MFD.

In implementations, the one or more processors can be further operable to execute the computer-executable components stored within the memory to perform initializing the identification information of the tag with the one or more operations associated with the tag.

In implementations, a computer-implemented method for operating a multifunctional device (MFD) is disclosed. The computer-implemented method can comprise selecting a tag from among one or more tags, wherein at least the tag that was selected comprises identification information associated with one or more operations; receiving the identification information from the tag; identifying the one or more operations based on the identification information that was received; and transmitting the one or more operations to the MFD.

In implementations, each of the one or more tags can be differentiable by a property selected any, or combination of, color, size, and shape.

In implementations, the one or more operations can comprise operations including any, or combinations of scanning, printing, faxing, formatting, selecting paper size, selecting paper quality, and storage.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings.

DETAILED DESCRIPTION

Figure 1:
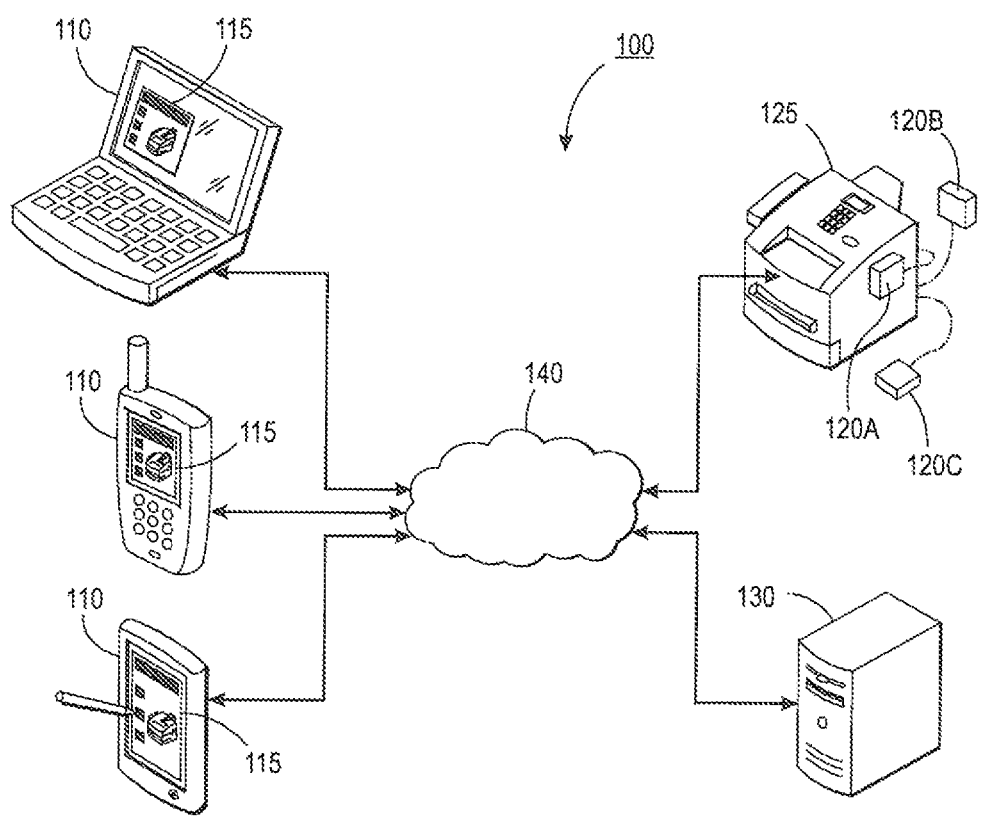
FIG. 1 is a diagram depicting an exemplary network environment 100 in accordance with teachings of the present disclosure.

Reference will now be made in detail to exemplary embodiments, examples of which are illustrated in the accompanying drawings. When appropriate, the same reference numbers are used throughout the drawings to refer to the same or like parts.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

In general, aspects consistent with the present teachings provide a computer-implemented method, a device, and a non-transitory computer-readable medium for a user-selectable and customizable capability for control and operation of a MFD using one or more computational tags associated with the MFD. Implementations consistent with the present teachings allow computing devices, such as mobile computing devices like smart phones, laptops, tablet devices, to communication with readable passive tags, such as tags communicating using a Near Field Communication (NFC) protocol, to provide a flexible method for storing and selecting user settings in a single-touch on a device like an MFD. The tags can include either a computer-readable volatile or non-volatile memory that can store one or more unique identifiers and be read and/or written to be the computing devices The one or more tags can be passive, so that the MFD does not itself need to support NFC hardware, which is provided by the computing device. The tags may also be computational. In an example implementation, multiple NFC tags can be provided on the MFD and named or color coded. A user can use a mobile device to associate an action and set of options with a tag, after which activating the tag, for example, but not limiting to, by touching the tag, with the mobile device triggers the action with the given options. The user can associate different actions and options with the other tags. The association can be determined by the computing device, rather than the tags themselves, so that different users can associate different actions with the same tags. This allows the ability to provide a flexible and inexpensive way to simplify, expedite and personalize device operation using passive tags.

In implementations, one or more tags can be positioned onto or near a device, such as an MFD, and used by a computing device that can be operable to read identifiers from the tags. If the tags are blank and contain no built-in identifiers which can be read, then the tags must be writeable so that they can be initialized by writing unique identifiers onto them. Likewise if a tag class (e.g. color) identifier is not built-in to the tag, the tag must be writeable so that it can be initialized with it. For example, the user can choose to associate actions, such as "scan double sided, color, legal size to xyz@gmail.com" with a first tag. Later, the user can approach the device and activate the first tag with the computing device where the device then performs the actions associated with the first tag. Another user can associate, using their own computing device, a second set of one or more operations, such as "fax double sided, black and white, legal, and fax to 555-4234" with the first tag. When that user activates the tag, those operations are communicated and performed by the device. Likewise, any user may associate different action/option combinations with the other tags, being limited only by the number of tags provided. In this way, the same tag can mean different things to different users, and different tags can mean different things to the same user.

In implementations, the user can have the ability of always associating a particular tag, for example tag A, with an action/option combination, regardless of the device it is attached to, or instead to make that depend on the device the tag is attached to, so that activating tag A on device X means something different to activating tag A on device Y. This can be accomplished by giving each tag a unique identifier specific to that instance of the tag only, and an additional identifier for its class, e.g. its color, which is shared by all tags in the class, e.g. all tags that color. Actions can then be keyed either to the unique tag identifier, or to the tag class identifier.

FIG. 1 is a diagram depicting an exemplary network environment 100 in which a user with computing device 110 can be control and/or communicate with multifunctional device ("MFD") 125 through one or more passive computational tags or "tags" 120, and optionally by communication with server 130, in accordance with teachings of the present disclosure. Throughout this disclosure, the use of "tag" and "tags" are used interchangeably and are used to indicate that more than one tags 120 may be associated with a single MFD 125. While FIG. 1 illustrates various systems contained in the environment 100, one skilled in the art will realize that these systems are exemplary and that the environment 100 can include any number and type of systems.

As depicted in FIG. 1, computing device 110 can be any kind of device capable of communicating with tags 120, MFD 125, and server 130. Computing device 110, for example, but not limited to, can be a personal computing device, such as a smartphone, a cellular phone, a handheld mobile device, a table device, a laptop computer, a portable computer, and the like, capable of executing custom applications. MFD 125 can be any machine that can operatively perform at least one of the following functions: printing, scanning, transmitting or receiving facsimiles, or copying.

Computing device 110 can communicate with tags 120 and MFD 125 and optionally server 130 during the course of running MFD communication application or "application" 115. Applications 115 may refer to any kind of program or application that is capable of operating or executing on computing device 110, whether to provide features intended for user interaction or simply to provide underlying services used by computing device 110 or an operating system executing thereon. For example, throughout this application, for the purpose of explaining certain exemplary operations only, reference will be made to one or more application 115 that provides functionality for allowing computing device 110, and thus the user of the device, to control and communicate operations associated with MFD 125 using tags 120, and, optionally, by interaction with server 130.

Computing device 110 can also communicate with server 130 over communications network 140. Application 115 running on computing device 110 can be operable to instruct computing device 110 to open a communication channel with server 130 over communication network 140 and can be operable to initiate communications with tags 120. Server 130 can be a centrally located server in proximity to computing device 110 and/or tags 120, a distributed server located over many remote locations, or a cloud-based server. Server 130 can be any kind of device capable of communicating with computing device 110 in order to provide additional functionality to computing device 110 with respect to tags 120 and MFD 125.

Communications network 140 may comprise one or more wired networks, such as the Internet, a wide area network (WAN), a local area network (LAN), etc., and may also provide for wireless communications using wireless protocols, such as wireless Ethernet, Global System for Mobile Communications (GSM), Enhanced Data rates for GSM Evolution (EDGE), Universal Mobile Telecommunications System (UMTS), Worldwide interoperability for Microwave Access (WiMAX), long Term Evolution (LTE), Bluetooth, etc.

Tags 120, also called "smart tags" or "info tags," are devices that includes computer-readable memory and a radio chip attached to an antenna that is operable to communicate using near field communication (NFC) technology, over radio frequencies (RF), or using Bluetooth. Tags 120 can be active where they include their own power source or passive where they do not include a power source to power operations and relies upon other devices to provide power through magnetic induction, such as computing device 110, the term "passive" is applied to characterize these tags. For example, but not limited to, tags 120 can be a NFC tag of types 1-4. The computer-readable storage on tags 120 can store information, including, but not limited to, identification information, a network address of a MFD associated with the tag, or other unique reference associated with the MFD, in accordance with the teachings of the present disclosure. In implementations, the information stored on tag 120 can allow application 112 executing on computing device 110 to not only read the identifier of tag 120 and thus determine the required operation and options, but also the network address of MFD 125 that is being controlled when tag 120 is activated by computing device 110.

In implementations, computing device 110 can communicate with MFD 125 over a secured communication protocol, such as a virtual private network, using an indirect connection through a shared rendezvous point. Other secured and/or encrypted communication protocols can also be used. In this implementation, tag 120 can also store information that can be used by computing device 110 to establish a secured communications connection with MFD 125.

In implementations, tag 120 can include information that can be continually refreshed and read by computing device 100 to provide proof that computing device 100, and thus the user, has been within proximity of MFD 125. For example, tag 120 can store a one-time use code that can be read by computing device 110. Once the one-time use code has been read, a new code can be stored on tag 120. The one-time use code can then be used to establish that the user has been within proximity of MFD 125.

Tags 120 can be affixed to a fixed physical location, such as a wall, or can be affixed to a device, such as MFD 125 like a document processing device. Other suitable locations and devices with which tags 120 can be affixed to or associated with could be also used as would be apparent. Tags 120 can also be built into the physical housing of a device, protected behind a transparent plaque, or otherwise conveniently incorporated more or less noticeably into a physical environment. Tags 120 can also be intergraded with objects they are affixed to using, for example, an active near-field communication (NFC) hotspot.

By way of a non-limiting example, tags 120 can include individual tags 120a, 120b, and 120c associated with or connected to MFD 125. Although three individual tags are shown and described, this is merely an example. A single tag may be used or two or more tags may be used. In implementations, individual tags 120a, 120b, and 120c can be made distinguishable in one or more ways, including their appearance, i.e., by color, shape, size, position, or in their naming convention. For example, in one implementation, individual tags 120a, 120b, and 120c may be color-coded, where tag 120a is red, tag 120b is yellow, and tag 120c is blue. In other implementation, individual tags 120a, 120b, and 120c may have different shapes, where tag 120a is circular, tag 12Db is triangular, and tag 120c is rectangular. Other manners of distinguishing among tags 120 can be used.

Computing device 110, using application 115 or another suitable application, can initialize tags 120 by providing one or more tags 120 with a unique identification code, which can be stored in a memory of each one or more tags 120. This can be done prior or while each of the one or more tags 120 are associated with or to connected to, i,e., affixed to, MFD 125. Additional information can also be stored within the memory of each of the one or more tags 120, for example, but not limited to, a network address or other unique identifiers of MFD 125 associated with a particular tag. The information stored on computing device 110 and/or tags 120 can also be provided to server 130 via network 140 for storage and later retrieval. In implementations, computing device 110 can use a device serial number or other unique device identified stored in the memory of the tags 120 to determine a device address of the MFD 125 using a network service or network discovery lookup procedure.

In implementations, computing device 110, using application 115 or another suitable application, can then associate ore or more actions to be performed by MFD 125 in a memory of computing device 110. Application 115 can then control operations of MFD 125 when computing device 110 comes within proximity of one of the one or more tags 120 for which the unique identification code associated with MFD 125 and one or more operations to be performed by the MFD 125 have been associated. By allowing individual computing devices to store information related to one or more tags 110, MFD 125, and operations associated with MFD 125, each user can then associate different operations with the same tag. For example, user A can associate the operations including "scan double sided, color, legal size and send to email address userA@xerox.com" and user B can associate operations "scan double sided, letter size and send to email address userB@xerox.com and file a copy of the document in a Microsoft Sharepoint document repository 'R'" with the same tag.

In implementations, each of the one or more tags 120 can store the one or more operations to be performed by MFD 125. For example, tag 120a can be initialized by user A using application 115 executing on computing device 110 and instructed to associate one or more operations with application 115 of user A. In this example, the one or more operations stored in the memory of tag 120a includes "scan double sided, color, legal size and send to email address userA@xerox.com." When another user, such as user B, approaches and selects tag 120a associated with MFD 125, the same operations "scan double sided, color, legal size and send to email address userA@xerox.com" would be presented to user B. In this example, user B would not be able to customize the operations of MFD 125 associated with tag 120a using this method, since tag 120a has those operations stored within the memory of tag 120a. Instead the association would have to be made within the user's computing device 110, or some network service accessible to it.

MFD 125 can communicate with computing device 110 using communication network 150 including various wired and wireless communication protocols and/or platforms similar to communications network 140. MFD 125 and computing device 110 can interact over these communication protocols and/or platforms using a variety of control protocols and methods, including, but not limited to, TWAIN, Web Services for Devices (WDS), which includes Microsoft Scan Service Definition (WS-Scan), and Extensible Interface Platform (EIP) TWAIN is a software protocol and application programming interface (API) that regulates communication between software applications and imaging devices such as scanners and digital cameras. WS-Scan, by Microsoft Corporation, is a web services protocol specification for consumer scanning peripheral. EIP, by Xerox Corporation, is a software platform using web-based tools can be used to create server-based application that can be configured for a user-interface of MFD 125.

By way of a non-limiting example, a user carries a mobile device, such as computing device 110, which has hardware and/or software capable of communicating with tag 120, MFD 125, and optionally server 130. Application 115, executable by computing device 110, is operable to instruct computing device 110 to open a communications channel with MFD 125 and control MFD 125, for example, using one or more protocols discussed above. Application 115 can be operable to instruct MFD 125 to perform various functions, such as scan image options, and destination addresses for the scans to be delivered to, and likewise for faxing, copying and other operations.

Figure 2:
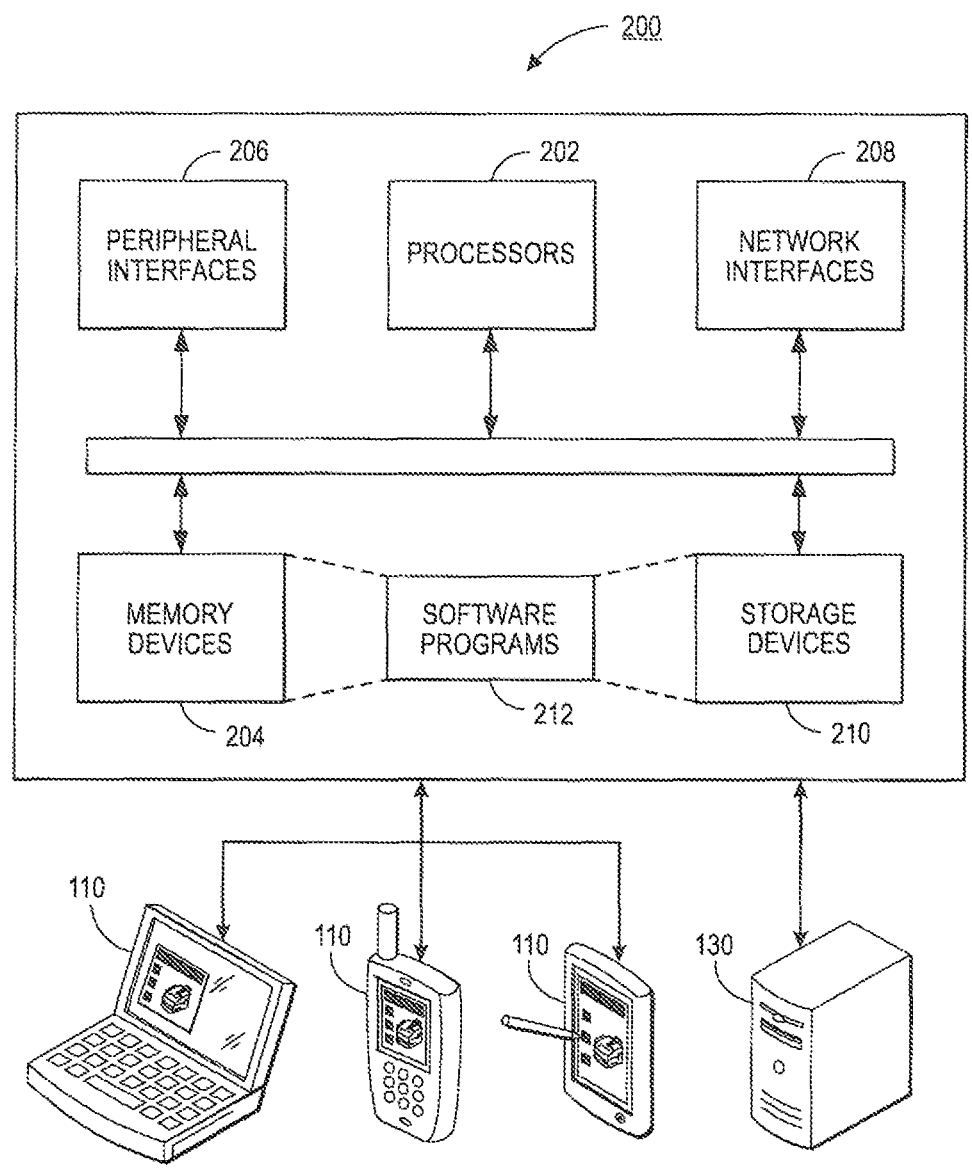
FIG. 2 is a diagram depicting an exemplary hardware configuration for computing device 200, such as computing device 110 or server 130, that may be used to perform one or more of the processes as described herein.

FIG. 2 is a diagram depicting an exemplary hardware configuration for computing device 200, such as computing device 110 or server 130, that may be used to perform one or more of the processes as described herein. While FIG. 2 illustrates various components contained in computing device 200, one skilled in the art will realize that FIG. 2 is one example of a computing device and that additional components can be added and existing components can be removed.

As illustrated in FIG. 2, computing device 200 can include one or more processors 202 of varying core configurations and clock frequencies. Computing device 200 can also include one or more memory devices 204 that serve as a main memory during the operation of computing device 200. Computing device 200 can also include one or more peripheral interfaces 206, such as keyboards, mice, touchpads, computer screens, touchscreens, etc., for enabling human interaction with and manipulation of computing device 200.

Computing device 200 can also include one or more network interfaces 208 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. Computing device 200 can also include one or more storage device 210 of varying physical dimensions and storage capacities, such as flash drives, hard drives, random access memory, etc., for storing data, such as images, files, and program instructions for execution by the one or more processors 202. One or more software programs 212 can be stored in the one or more memory devices 404 and/or on in the one or more storage devices 210. For example, the one or more software program can include the OS 208, the data usage service 202, and any other software program utilized by computing device 200.

Figure 3:
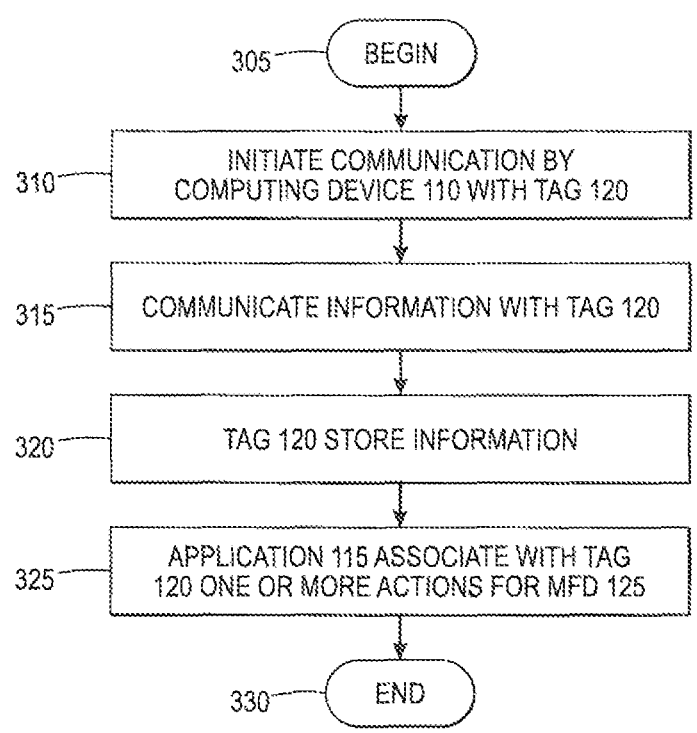
FIG. 3 depicts an example process by which computing device 110 initializes interaction with tag 120, in accordance with the present teachings.

In embodiments, the components of computing device 200 need not be enclosed within a single enclosure or even located in close proximity to one another. Those skilled in the art will appreciate that the above-described componentry are examples only, as computing device 200 can include any type of hardware componentry, including any necessary accompanying firmware or software, for performing the disclosed embodiments. Computing device 200 can also be implemented in part or in whole by electronic circuit components or processors, such as application-specific integrated circuits (ASICs) or field-programmable gate arrays (FPGAs), FIG. 3 depicts an example initialization process in accordance with implementations consistent with the present teachings. The process can begin at 305. At 310, application 115 executing on computing device 110 initiates communication with one of the one or more tags 120 associated with MFD 125. As discussed above, application 115 can be operable to communicate with tag 120 using a communications protocol, such a near field communication. At 315, application 115 can communicate information to tag 120, such as a unique identifier and a network address corresponding to MFD 125. At 320, tag 120 can store the information that was communicated by application 115 within one or more memory components of tag 120. At 325, application 115 can associate and store with tag 120 one or more actions or operations to be performed by MFD 125. At 330, the process can end or return to a previous step to initialize another tag 120.

Figure 4:
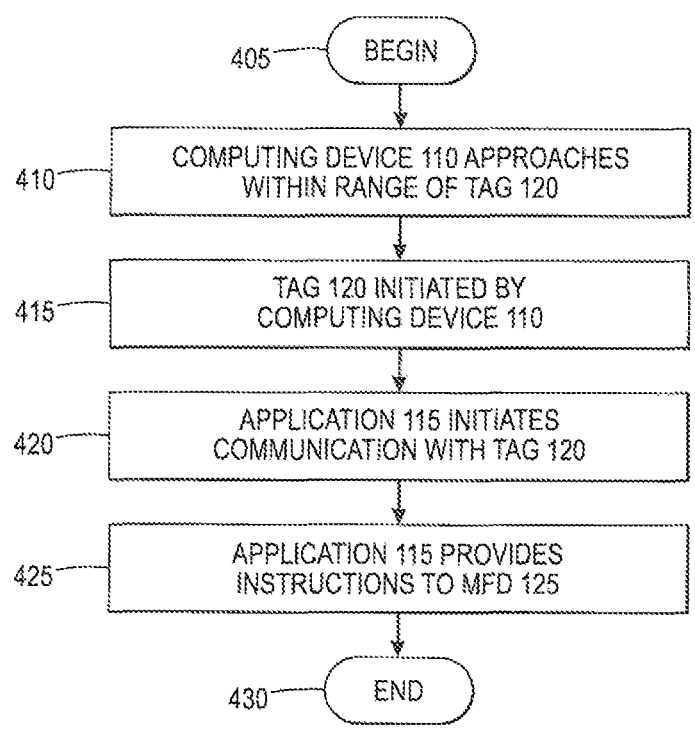
FIG. 4 depicts an example process by which computing device 110 communicates with tag 120, in accordance with the present teachings.

FIG. 4 depicts an example process in accordance with implementations consistent with the present teachings. The process can begin at 405. At 410, a user with computing device 110 approaches within proximity to one of the one or more tags 120, which can be in proximity to, connected to, associated with, or affixed to MFD 125. At 415, tag 120 is activated by computing device 110. For example, the user can position computing within a specified range of tag 120 or physically contact tag 120 with computing device 110. At 420, application 115 can instruct computing device to open a communication channel with MFD 125 using protocols discussed above, such as TWAIN. WS-Scan, or EIP. At 425, application 115 can send instructions and/or commands to MFD 125 to instruct MFD to perform operations or functions previously stored in memory of computing device 110 or in memory of tag 120. At 430, the process can end or return to a previous step.

Certain embodiments described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method for operating a multifunctional device (MFD), the computer-implemented method comprising:
    receiving a first identification information from a first tag that is associated with a MFD and receiving a second identification information from a second tag that is associated with the MFD, wherein the first tag is visually identifiably different than the second tag by appearance to a user;
    associating a first set of operations to be performed by the MFD with the first identification information and associating a second set of operations to be performed by the MFD with the second identification information;
    comparing the first and the second identification information that was received with other identifying information associated with other tags, other MFDs, or both;
    identifying, by a processor, one or more operations in the first set of operations or in the second set of operations based on the first and second identification information that was compared;
    selecting one or more operations in the first set of operations or the second set of operations to be performed by the MFD; and
    transmitting the one or more operations to the MFD.

2. The computer-implemented method according to claim 1, wherein the first and the second identification information is received from the first and the second tag over a near-field communication protocol.

3. The computer-implemented method according to claim 1, wherein the one or more operations transmitted to the MFD is transmitted over a communications protocol comprising: TWAIN, WS-Scan, EIP, or Web Services for Devices.

4. The computer-implemented method according to claim 1, wherein the one or more operations comprises operations provided to the MFD comprise any, or combinations of, scanning, printing, faxing, formatting, selecting paper size, selecting paper quality, and storage.

5. The computer-implemented method according to claim 1, wherein the MFD comprises devices that are operable to perform operations comprising any, or combinations of, scanning, printing, and faxing.

6. The computer-implemented method according to claim 1, further comprising initializing the identification information of the first and the second tag with the one or more operations to be performed by the MFD associated with the first and the second tag.

7. The computer-implemented method according to claim 1, wherein the first and the second tag is operable to communicate using near field communication, radio frequencies, or a Bluetooth protocol.

8. The computer-implemented method according to claim 1, wherein the first and the second tag is a active tag with an associated power source or a passive tag.

9. The computer-implemented method according to claim 1, wherein the first and the second tag is a computational tag or a passive tag.

10. The computer-implemented method according to claim 1, wherein the one or more operations comprise instructions to the MFD, instructions to a computing device that received the identification information, instructions to a third party network service, instructions that are human-readable and human-actionable, or combinations thereof.

11. The computer-implemented method according to claim 10, wherein the third party network service comprises a back-end workflow service.

12. A device comprising:
    one or more processors; and
    a non-transitory computer readable medium comprising instructions that cause the one or more processors to perform a method comprising:
    receiving a first identification information from a first tag that is associated with a MFD and receiving a second identification information from a second tag that is associated with the MFD, wherein the first tag visually identifiably different than the second tag by appearance to a user;
    associating a first set of operations to be performed by the MFD with the first identification information and associating a second set of operations to be performed by the MFD with the second identification information;
    comparing the first and the second identification information that was received with other identifying information associated with other tags, other MFDs, or both;
    identifying, by a processor, one or more operations in the first set of operations or in the second set of operations based on the first and second identification information that was compared;
    selecting one or more operations in the first set of operations or the second set of operations to be performed by the MFD; and
    transmitting the one or more operations to the MFD.

13. The device according to claim 12, wherein the identification information is received from the first and the second tag over a communication protocol comprising a near-field communication protocol, a radio frequency protocol, or a Bluetooth protocol.

14. The device according to claim 12, wherein the one or more operations transmitted to the MFD is transmitted over a communications protocol comprising any, or combinations of, TWAIN, WS-Scan, EIP, and Web Services for Devices.

15. The device according to claim 12, wherein the one or more operations comprises any, or combinations of, scanning, printing, faxing, formatting, selecting paper size, selecting paper quality, and storage.

16. The device according to claim 12, wherein the MFD comprises devices operable to perform operations comprising any, or combinations of, scanning, printing, and faxing.

17. The device according to claim 12, wherein the one or more processors are further operable to execute the computer-executable components stored within the memory to perform initializing the identification information of the first and the second tag with the one or more operations associated with the first and the second tag.

\* \* \* \* \*